United States Patent Office 3,194,254
Patented July 13, 1965

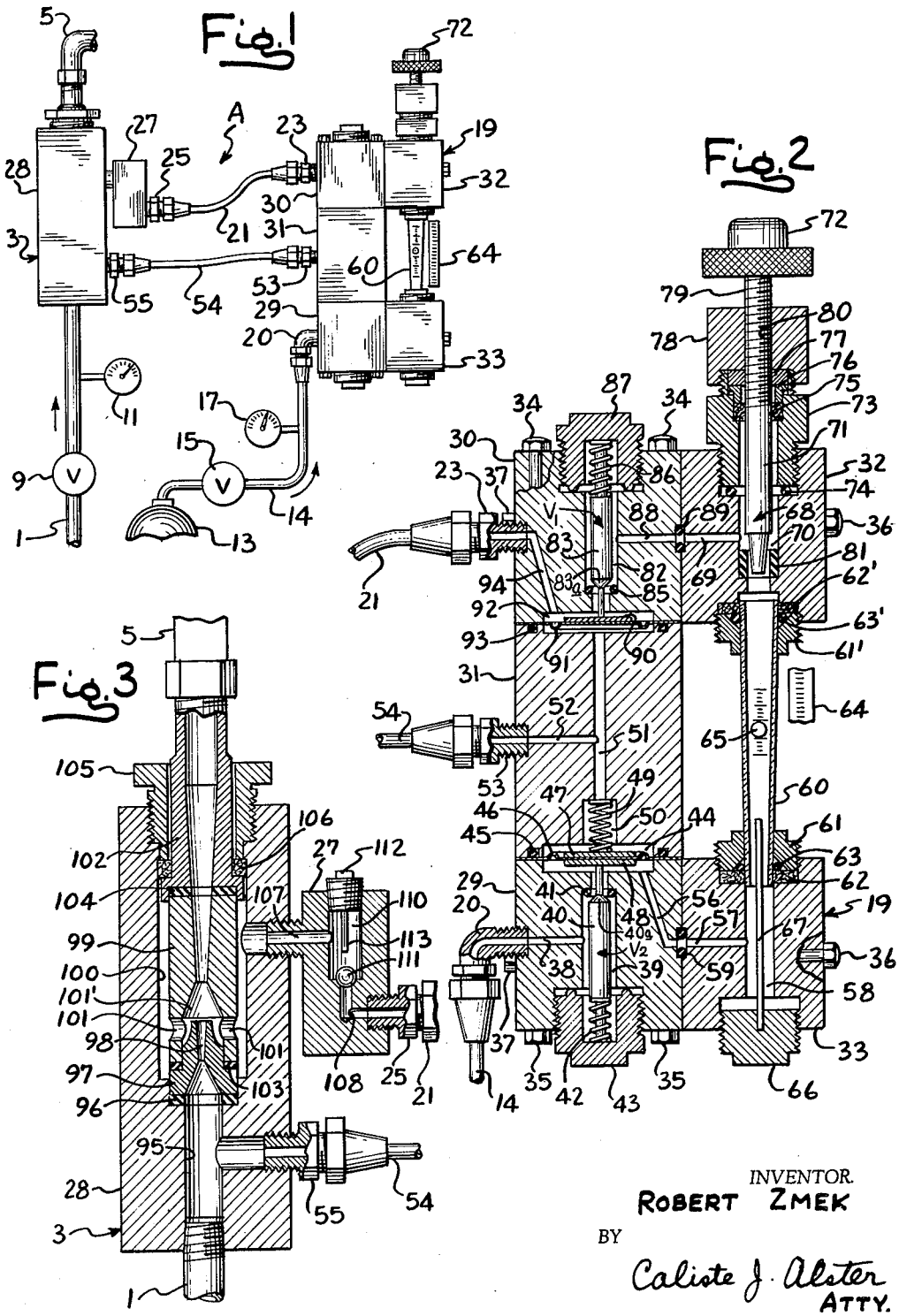

1

3,194,254
WATER CHLORINATOR
Robert Zmek, Chicago, Ill., assignor to Everson Manufacturing Corporation, Chicago, Ill., a corporation of Illinois
Filed Oct. 26, 1962, Ser. No. 233,345
4 Claims. (Cl. 137—114)

This invention relates to new and useful improvements in water purification equipment, and more particularly to apparatus for chlorinating water.

It is an object of the present invention to provide a novel and improved apparatus for treating water with a gas, such as chlorine, to purify the water prior to delivery of the water to a swimming pool, storage reservoir, or other place of application.

It is a further object of the present invention to provide apparatus of the type stated in which the pressure of the water is utilized to maintain a substantially constant gas pressure in the control portion of the system despite variations in gas pressure in the gas supply line leading to the control portion of the system. This insures that the quantity of gas per unit of time supplied to the water remains substantially unchanged from a preselected amount.

It is also an object of the present invention to provide apparatus of the type stated in which water pressure-control of the gas pressure simplifies the construction of the apparatus and eliminates the need for small control orifices which might become clogged and foul the control system.

It is another object of the present invention to provide apparatus of the type stated in which the gas supply automatically cuts off when the controlling water pressure is shut off, and further wherein any water in the gas injector, that forms part of the system, is prevented from back flowing into the vital parts of the control portion of the system.

The attainment of the above and further objects of the present invention will be apparent from the following specification taken in conjunction with the accompanying drawing forming a part thereof.

In the drawing:

FIG. 1 illustrates apparatus constructed in accordance with and embodying the present invention, FIG. 1 being partially schematic;

FIG. 2 is a sectional view of the gas control unit that forms part of the present invention; and FIG. 3 is a sectional view of the gas injector-check valve unit that also forms part of the present invention.

Referring now in more detail and by reference characters to the drawing, which illustrates a preferred embodiment of the present invention, A designates a water purification system that includes a water supply line 1 for delivering water to an injector 3 in which gas, such as chlorine, is injected into the water, whereupon the water-gas solution is discharged from the injector 3 into pipe 5 for delivery to a storage tank, swimming pool or other point of application (not shown). The water supply line 1 may include a valve 9 and a water pressure gauge 11. Chlorine for the water may be supplied from a tank or cylinder 13. A gas-supply line 14, having suitable valving 15 and a pressure gauge 17 therein, delivers the chlorine gas to a gas-control and measuring unit 19, hereinafter to be more fully described, and is coupled thereto through a nipple 20. The gas is discharged from the unit 19 through a line 21 that includes nipples 23, 25 threaded into the unit 19 and a check valve housing 27 which is, in turn, threaded into the injector housing 28.

The unit 19 has a body that comprises a gas inlet block 29, a gas outlet block 30, a hydraulic chamber block 31 between the inlet and outlet blocks 29, 30, and upper and lower meter blocks 32, 33 that are located to one side of the inlet and outlet blocks 29, 30, respectively.

2

The blocks 29, 30, 31 may be secured together in any suitable manner, as for instance by tie rods 34 that extend through the blocks 29, 30, 31 and are provided at one end with threads upon which nuts 35 are threaded. Likewise, similarly constructed tie rods 36 that have nuts 37 threaded thereon may be used to secure together the blocks 30, 32 and the blocks 29, 33.

Formed in the gas inlet block 29 is a passageway 38 that is in communication with the gas supply line 14 through the nipple 20. This passageway 38 terminates in a valve chamber 39 having a check valve $V_2$ provided with a valve stem 40 therein. The valve stem 40 has a head 40a and is biased toward a valve seat 41 by a compression spring 42, which abuts against a plug 43 that is threaded into the bottom end of the gas inlet block 29. The valve stem 40 projects upwardly beyond the valve seat 41 and into a diaphragm chamber 44 that is in communication with the valve chamber 39 when the valve head 40a is unseated. The diaphragm chamber 44 is formed by cooperating recessed portions of the gas inlet block 29 and the hydraulic chamber block 31, and an O-ring 45 surrounds and forms a seal around the diaphragm chamber 44.

Secured between the blocks 29, 31 and extending across the diaphragm chamber 44 is a flexible diaphragm 46 having diaphragm plates 47, 48 on opposite sides thereof. The valve stem 40 is in contact with the lower diaphragm plate 48 while a compression spring 49 abuts the upper diaphragm plate 47. The compression spring 49 is located in a recess 50 that is in the block 31 and, in effect, constitutes an extension of the diaphragm chamber 44.

Also provided in the block 31 are passageways 51, 52 which are in communication with each other and the diaphragm chamber 44. A nipple 53 is threaded into one side of the block 31 for connection with a water pressure line 54 that is connected to the injector block 28 through a nipple 55 threaded thereinto. Consequently, water from the supply line 1 can be supplied to the diaphragm chamber 44, whereby the water pressure may be applied to the diaphragm 46. The spring 49 dampens minor variations in water pressure on the diaphragm 46. At the same time, chlorine from the tank 13 will be delivered to the supply line 14, inlet nipple 20, and passageway 38 to the valve chamber 39. With sufficient water pressure on the upper side of the diaphragm 46, the valve head 40a will be unseated and chlorine gas will flow across the valve seat 41 and enter the diaphragm chamber 44 and apply pressure against the lower side of the diaphragm 46, whereupon the chlorine gas will pass outwardly from the chamber 44 through a passageway 56.

The hydraulic pressure in the line 1 is reasonably constant during operation of the system and this pressure may, for example, be in the order of twenty-five p.s.i. This hydraulic pressure, which will be applied to the diaphragm 46 upon opening of the water line valve 9, is more than adequate to cause the valve head 40a to unseat from valve seat 41. The chlorine tank pressure is considerably higher than twenty-five p.s.i. and may be in the order of ninety p.s.i. This high chlorine pressure is present in the valve chamber 39. Moreover, if the valve head 40a is unseated due to hydraulic pressure on the upper side of the diaphragm 46, the chlorine will enter the diaphragm chamber 44 and apply pressure to the diaphragm 46 in opposition to the hydraulic pressure thereon. The chlorine pressure is widely variable from time to time due to such factors as the temperature of the supply line 14 and quantity of gas in the tank 13. If the chlorine pressure in the diaphragm chamber 44 rises above the hydraulic pressure as a result of any rise in chlorine tank or line 14 pressure, the diaphragm 46 will be deflected away from the valve seat 41 allowing the spring 42 to urge the pressure-reducing valve head 40a toward the seat 41 and restrict the flow of chlorine from the valve chamber 39 into the diaphragm chamber 44, whereby the chlorine pressure on the diaphragm 46 is reduced to approximately that of the water pressure. On the other hand, if the chlorine pressure in the line 14 and valve chamber 39 drops, the reduced chlorine pressure will be deflected in the chlorine side of the diaphragm chamber 44 and the hydraulic pressure will deflect the diaphragm 46 downwardly, further unseating the valve head 40a from its seat 41. This increases the flow of chlorine on the diaphragm 46 until the chlorine and water pressures are equalized. In this way the pressure of the chlorine entering the passageway 56 is not only reduced from the tank pressure but the valving arrangement is such that the reduced chlorine pressure is kept reasonably constant by the application of the substantially constant hydraulic pressure on the diaphragm 46.

The passageway 56 is in communication with passageway 57 and the latter, in turn, with a bore 58 in the lower meter block 33. An O-ring 59 may be used to seal the junction of the blocks 29, 33 in the region of the passageways 56, 57. Mounted on the upper end of the block 33 and in communication with the bore 58 is a calibrated transparent tapered metering tube 60, which is suitably secured in place at its lower end by a packing gland 61 that cooperates with packing 62 and an O-ring 63. In a similar manner, the upper end of the tube 60 is secured to the upper meter block 33 by a packing gland 61', packing 62' and O-ring 63'.

Mounted adjacent to the metering tube 60, in any suitable manner, is a meter scale 64 that is preferably calibrated in pounds of chlorine per 24 hours. Within the metering tube 60 is an indicating float 65 that is adapted to be suspended by the velocity of the chlorine passing upwardly through the tube 60 and will assume a level in the tube in accordance with the volume of the chlorine passing through the tube 60 so that by observing the level of the float 65 in relation to the meter scale 64, the rate of chlorine injected into the water can be visually determined. A plug 66 is threaded into the low end of the bore 58, and mounted in the plug 66 is a float stop 67 that extends upwardly into the lower end of the metering tube 60 to constitute a support for the float 65 when the system is not in operation.

Chlorine that is discharged from the upper end of the metering tube 60 passes through an adjustable gas-flow control valve, generally designated at 68, and into passageways 69, 70 in the upper meter block 32. The valve 68 comprises a valve stem 71 in the passageway 70, and the valve stem 71 projects upwardly and outwardly of the block 32, terminating in a manipulating knob 72. A valve stem guide 73, through which valve stem 71 axially extends, is threaded into an opening in the top of the block 32 and bears sealing-wise against an O-ring 74. The upper end of the guide 73 receives suitable packing 75, a packing gland 76, and a valve stem retainer 77. A valve packing nut 78 is threaded onto the upper threaded end of the guide 73. The valve stem 71 is threaded at its upper end 79 for engagement with the threaded axial bore 80 of the nut 78. Thus by rotation of the valve stem 71, the lower tapered end thereof may be moved toward and away from a valve seat 81 to vary the valve opening and adjust the rate of flow of chlorine gas through the system. Control of the chlorine flow by the valve 68 is made possible since the pressure of the chlorine supplied to the metering tube 60 is kept reasonably constant in the manner previously described.

Formed in the gas outlet block 30 is a check valve chamber 82 that receives a check valve $V_1$ having a stem 83 and a head 83a which is biased toward its seat 85 by a spring 86. The spring 86 also abuts a plug 87 threaded into the top of the block 30. The valve chamber 82 is in communication with a passageway 88 which is, in turn, in communication with the passageway 69. An O-ring 89 seals the blocks 30, 32 in the region of the passageways 88, 69. The lower end of the valve stem 83 is urged against a diaphragm plate 90 on the upper side of a valve diaphragm 91 that is similar to the diaphragm 46, previously described. Similarly, the diaphragm 91 is disposed across a diaphragm chamber 92 that is formed by cooperating recessed portions of the blocks 30, 31, and is in communication with the passageway 51. An O-ring 93 forms a seal surrounding the diaphragm chamber 92.

From the foregoing it will be seen that the hydraulic pressure applied to the diaphragm 46 is likewise applied to the lower side of the diaphragm 91. This hydraulic pressure will deflect the diaphragm 91 upwardly and holds the valve head 83a off at its seat 85 to allow chlorine to flow past valve stem 83 into the upper side of the diaphragm chamber 92 and passageway 94 for delivery to the line 21 and to the injector check valve housing 27 and injector 3. However, if the hydraulic pressure on the diaphragm 91 drops below a specified level, the spring 86 will urge the valve head 83a against its seat 85 and shut off the supply of chlorine delivered to the injector 3. Seating of the check valve head 83a also prevents any backflow of water from the injector 3 from entering the vital parts of the control unit 19 back of the valve seat 85.

The injector housing 28 has an axial bore 95 into which is threaded the water supply pipe 1, and the bore 95 is enlarged to provide a radial seat that receives a gasket 96. An injector throat member 97 fits against the gasket 96. The throat member 97 has a restriction 98 through which the water flows, thereby greatly to reduce its pressure as a result of the Venturi effect created. A nozzle member 99 is mounted in a further enlarged portion 100 of the bore 95 and surrounds the restriction 98. The nozzle member 99 is of smaller diameter than the bore portion 100 and has ports 101 and a nozzle chamber 101' whereby chlorine may be injected into the water. The water then passes through solution discharge nipple 102 and then to the pipe 5. Formed on the throat member 97 is a seat having a gasket 103 for receiving the lower end of the nozzle member 99 and similarly the upper end of the nozzle member 99 has a gasket 104 for receiving the nipple 102 which, in effect, forms a continuation of the nozzle member 99. The members 97, 99, 102 are held in the housing 28 by a packing gland 105 threaded thereinto, the packing gland 105 also retaining packing 106.

The line 21 communicates with the ports 101 through passageways 107, 108 and a chamber 110 in the auxiliary check valve 27. This check valve has a check ball 111 and a plug 112, the latter having a depending stop 113.

When the vacuum is established at the throat member 97, chlorine will be drawn under vacuum from the discharge side of the valve 68 and will flow past valve stem 83 and valve 111, line 21 and into the ports 101 for injection into the water. Thus, the part of the system in which the chlorine flows from the chamber 70 to the ports 101 is under vacuum. The vacuum is, of course, such that the ball check valve 111 will be lifted and thus opened.

If the water pressure should be shut off, the valves $V_1$, $V_2$ will, under the action of springs 42, 86, close, shutting off the chlorine supply to the meter tube 60 and the chlorine from the block 30 to the ports 101. The valve 111 will also close and prevent back flow of water into the line 21 and thus operates as an additional safety device in that respect.

In compliance with the requirements of the patent statutes I have herein shown and described a preferred embodiment of the invention. It is, however, to be understood that the invention is not limited to the precise construction herein shown, the same being merely illustrative of the principles of the invention. What is considered new and sought to be secured by Letters Patent is:

1. A gas supply control unit for a water purification system, said unit comprising a body having means that form a gas-flow path having contiguous portions constructed and arranged so that the gas flows therethrough first under pressure and then under vacuum, a valve in the pressure portion of said path and through which the gas flows for reducing the pressure of the gas to a pressure that is substantially greater than vacuum, a check valve in the vacuum portion of the flow path and through which the gas flows, spring means biasing each valve toward its closed position, pressure-responsive valve-actuating means for opening each valve, said pressure-reducing valve being biased toward its closed position responsive to said gas pressure in its outlet acting on its actuating means, and means forming a water passageway into the body and into communication with each valve actuating means so that water under sufficient water pressure will maintain the valves open and the water pressure will increase the pressure on the discharge side of the pressure-reducing valve in response to decreases in gas pressure on the intake side of that valve.

2. A gas supply control unit for a water purification system, said unit comprising a body having means that form a gas flow path having contiguous portions constructed and arranged so that the gas flows therethrough first under pressure and then under vacuum, a valve in the pressure portion of said path and through which the gas flows for reducing the pressure of the gas to a pressure that is substantially greater than vacuum, a check valve in the vacuum portion of the flow path and through which the gas flows, spring means biasing each valve toward its closed position, said body having diaphragm chambers associated with each valve, a pressure responsive valve-actuating diaphragm in each chamber for opening each valve, said pressure-reducing valve also being biased toward its closed position responsive to said gas pressure acting on one side of its diaphragm, and means forming a water passageway into the body and into communication with one side of the check valve diaphragm and the other side of the pressure-reducing valve diaphragm so that water under sufficient water pressure against the diaphragms will maintain the valves open and the water pressure will increase the pressure on the discharge side of the pressure-reducing valve in response to decreases in gas pressure on the intake side of that valve.

3. A gas supply control unit for a water purification system, said unit comprising a body having means that form a gas flow path having contiguous portions constructed and arranged so that the gas flows therethrough first under pressure and then under vacuum, a valve in the pressure portion of said path and through which the gas flows for reducing the pressure of the gas to a pressure that is substantially greater than vacuum, a check valve in the vacuum portion of the flow path and through which the gas flows, a device in the flow path between the two valves for measuring the quantity of gas flowing through the unit, means for adjusting said quantity of gas flow, spring means biasing each valve toward its closed position, said body having diaphragm chambers associated with each valve, a pressure responsive valve-actuating diaphragm in each chamber for opening each valve, said pressure-reducing valve also being biased toward its closed position responsive to said gas pressure acting on one side of its diaphragm, and means forming a water passageway into the body and into communication with one side of the check valve diaphragm and the other side of the pressure-reducing diaphragm so that water under sufficient water pressure against each diaphragm will maintain the valves open and the water pressure will increase the pressure on the discharge side of the pressure-reducing valve in response to decreases in gas pressure on the intake side of that valve.

4. In a water purification system, a gas control unit comprising a body having means forming a gas flow path having contiguous portions constructed and arranged so that water-purifying gas first flows therethrough under pressure and then under vacuum, an inlet at one end of said gas flow path for receiving gas under pressure and an outlet at the other end of said gas flow path for discharging the gas under vacuum therefrom, a gas injector having means for receiving water and blending the gas therewith, a gas supply conduit connecting said outlet to the injector for delivering gas thereto, a pressure reducing valve in the pressure portion of said path and through which the gas flows for reducing the pressure of the gas to a pressure that is substantially greater than vacuum, a check valve in the vacuum portion of the flow path and through which the gas flows, a device in the flow path between the two valves for adjusting the quantity of gas flow, spring means normally biasing each valve toward its closed position, said body having a diaphragm chamber associated with each valve, a pressure responsive valve-actuating diaphragm in each chamber for opening each valve, said pressure-reducing valve also being biased toward its closed position responsive to said gas pressure acting on one side of its diaphragm, means forming a water passageway into said body and into communication with one side of the check valve diaphragm and the other side of the pressure reducing diaphragm so that water above a predetermined pressure against each diaphragm will maintain the two valves open in opposition to the respective spring means and water below said predetermined pressure will cause the spring means to close the two valves, thereby shutting off the flow of gas upstream of the pressure reducing valve and shutting off from flow past the check valve and into the gas flow path upstream therefrom water that may have accidentally entered said gas supply conduit from the injector, and auxiliary check valve means in the gas supply conduit for arresting the back flow of water in said gas supply conduit upstream from said injector.

References Cited by the Examiner

UNITED STATES PATENTS

| | | | |
|---|---|---|---|
| 2,637,690 | 5/53 | Everson | 137—100 |
| 3,004,548 | 10/61 | Janes | 137—505.12 X |

ISADOR WEIL, *Primary Examiner.*